Patented July 28, 1942

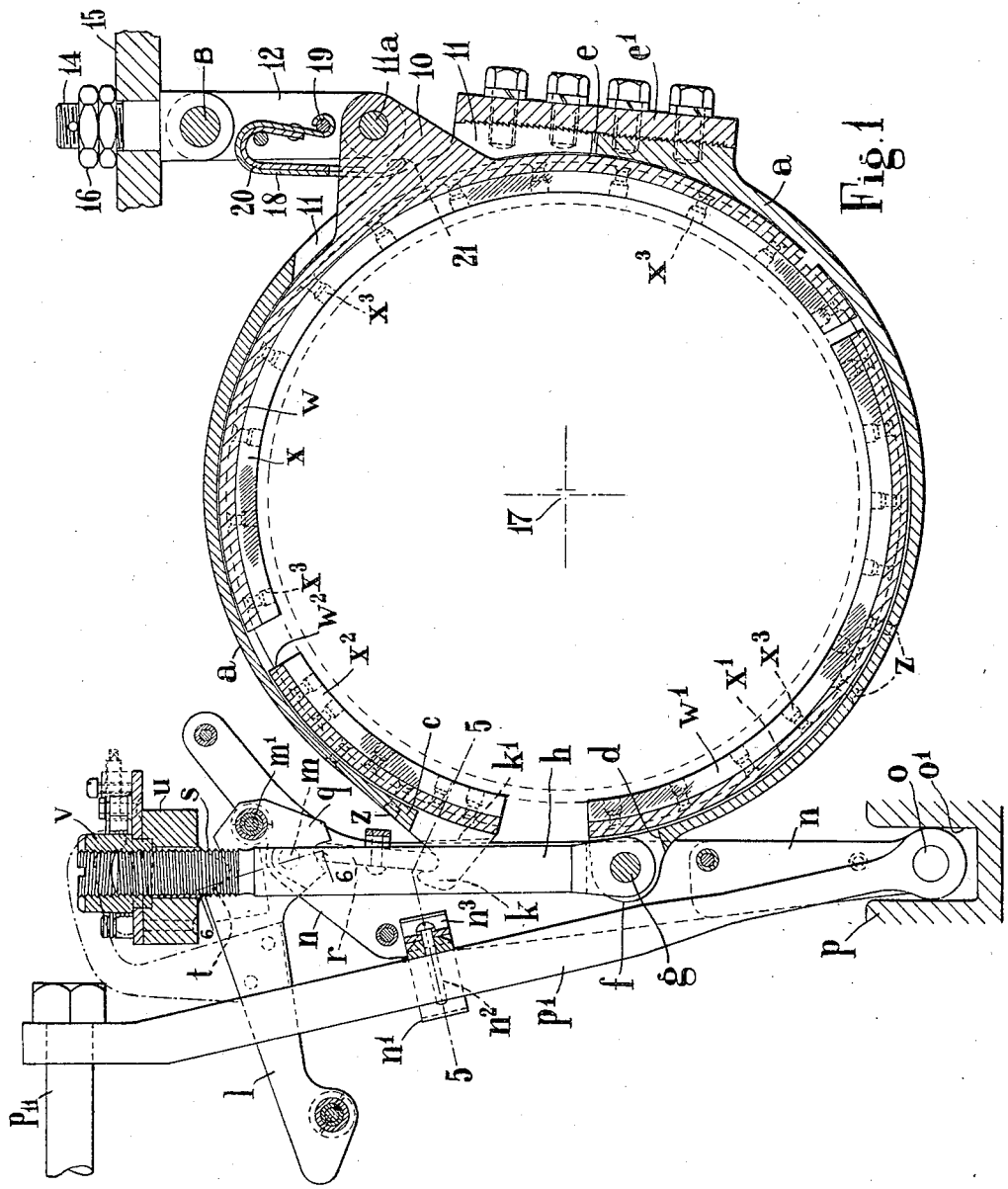

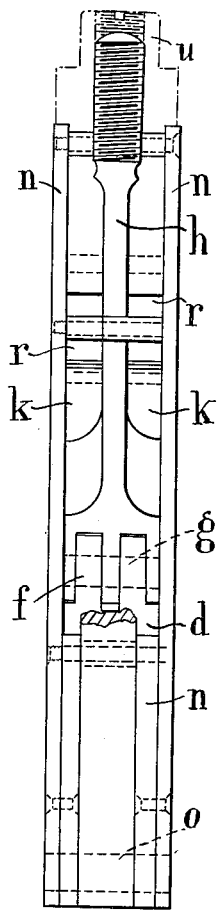
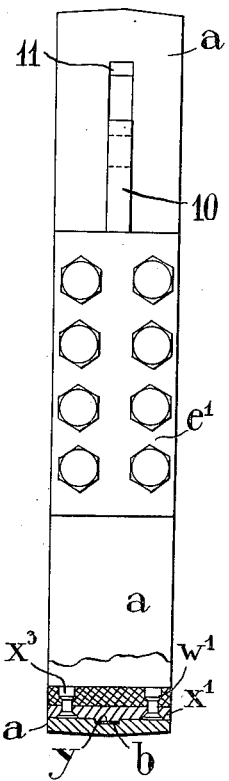
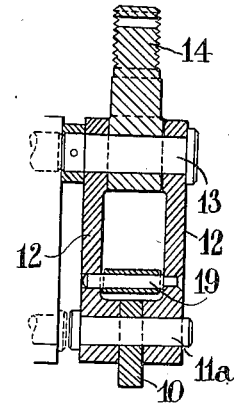
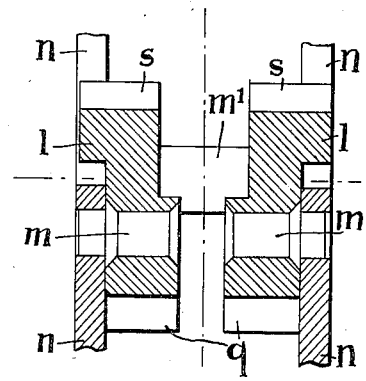
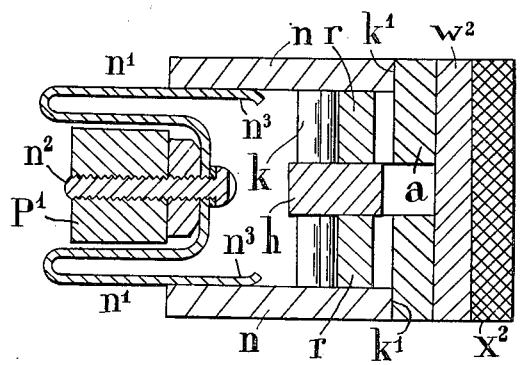

2,291,270

UNITED STATES PATENT OFFICE 2,291,270

BRAKE FOR CONTROLLING ROTARY MOTION

Walter Gordon Wilson, Winchester, England

Application January 5, 1940, Serial No. 312,582
In Great Britain January 25, 1939

9 Claims. (Cl. 188—77)

This invention relates to brakes for controlling rotary motion and has particular reference to flexible band brakes adapted to be tightened on rotary drums.

One object of the invention to be hereinafter described is an improved form of brake, which will be approximately equi-acting, and which comprises flexible members, which when the braking action is applied will not distort the centre axis of rotation irrespective of the torque or the force of application, but which will nevertheless permit of having the slack taken up as wear develops.

Another object of the invention is to prevent any unnecessary wear of the brake bands by friction when the brakes are inoperative.

The invention consists in an equi-acting flexible band brake comprising a single secondary brake element arranged between a primary brake element and the rotary member of which the rotation is to be checked, the secondary element being anchored at about its centre to a fixed-point external of the primary element and having two free ends, the arrangement being such that when the primary is tightened on the back of the secondary element an efficient braking action is produced whether the rotary member is turning in a clockwise or anti-clockwise direction.

Reference will now be made to the accompanying drawings, in which:

Figure 1 is a side-sectional elevation of a flexible band brake according to the invention.

Figure 2 is an edge view as seen from the left side of Figure 1 with certain parts omitted.

Figure 3 is a similar view as seen from the right side of Figure 1.

Figure 4 is a sectional view of a detail, and

Figure 5 is a horizontal section taken on the line 5—5 of Figure 1.

Figure 6 is a section taken on the line 6—6 Figure 1.

In carrying the invention into effect according to one example, the primary brake element $a$ of suitable material such as metal, and which is in the form of a band internally grooved as at $b$ (Figure 3) is placed in position around the rotary member or drum shown by dotted lines, the rotation of which is to be controlled, and left with two adjacent free ends, $c$, $d$, Figure 1. Such primary-element may either be continuous or as shown it may be divided as at $e$ by a split joint into two sections and connected together by a junction plate $e'$. One of the free ends $d$ terminates in an eye $f$ by which it is pivoted at $g$ to one end of a slack adjusting bolt $h$ forming a pull rod and the other adjacent end $c$ of the primary member $a$ is formed with a hooklike shoulder $k$.

The means for applying the brake may form part of a toggle system comprising a thrust pad lever $l$ fulcrumed on the pin $m$ as shown in Figure 6, the fulcrum pin being supported by and within a frame composed of side hooks $n$, one on each side of the slack adjusting bolt $h$ as seen in Figure 2 and also in the sectional view Figure 6.

The lower ends of the side hooks $n$ may be anchored directly to the bottom part of the gear box frame. Preferably, however, the lower ends of the side hooks are pivoted by means of a bolt $o$ to the bottom end of a strut $p'$ attached by its upper end to the casing of the gear box, for example, by the anchorage bolt $p''$ in which case the ends of the side hooks, the strut and the bolt $o$ are housed within a slot $o'$ provided in the framing $p$ of the gear box.

To retain the side hooks $n$ in position when the brake is out of action they are adapted to be frictionally held in relation to the strut $p'$ by means of a U-shaped spring generally denoted by $n'$ and shown in detail in Figure 5. The centre part of the spring is attached by screw $n^2$ to the strut $p'$ and the side limbs are doubled back as shown to provide a pair of yielding tongues $n^3$ which each frictionally grip against the inner surfaces of the side hooks $n$. The spring may, however, be arranged conversely, i. e. it may be attached to the side hooks and grip the strut. The lever $l$ near the fulcrum end is forked the pin $m'$ connecting the parts of the fork together, and the lever at its lower part has a nose $q$ to engage with, or ride upon, the hooked end $k$ of the primary brake member $a$. There may be direct engagement between the parts but Figure 1 illustrates a preferred arrangement according to which a simple compression strut $r$ made in two vertical parts, one on each side of the slack adjusting bolt $h$, is arranged intermediate of the thrust pad nose $q$ and the hooked end $k$. The upper part of the thrust pad lever $l$ adjacent the fulcrum $m$ is designed to engage by means of a notch or recess $s$, a projecting lug $t$, formed on a table $u$ on which is mounted a nut $v$ that is screwed on the free end of the slack adjusting bolt $h$.

The arrangement is such that the operating end of the thrust pad lever $l$ forms a two-armed lever, the respective leverage movements of which when operated around the fulcrum $m$ have the effect of simultaneously drawing towards one another the two free ends of the primary braking element a thus applying the brake as hereafter described.

Any suitable means may be employed for operating the toggle system which include the two-armed lever described, and such means may consist of strut-like members as shown for example in the specification of my prior United States Patent No. 1,888,191 dated November 15, 1932.

It will be gathered from the foregoing that the toggle mechanism is arranged wholly on one side of the rotary drum, and that the necessary anchorage as at p or p'' as well as the various operating centres and force applying points are arranged in, or closely adjacent to, a line common to all, whereby a movement of small ambit only will provide the necessary force to apply the brake. It is also to be noted that the position of the fulcrum point m of the actuating lever l relatively to the two arms thereof, may be so chosen that the respective leverage movements will impart equal or unequal movement to the two free ends of the primary brake element as desired.

A secondary brake element is fitted within the primary element, and consists of a suitable backing w faced with frictional material x and riveted or otherwise secured to the backing as shown at $x^3$. These together form the flexible brake band proper. It is of substantially the same cross-sectional width as the primary member a and is made in three parts w, x, w', x', $w^2$, $x^2$, and are all fitted with a projecting external rib y to engage with the internal groove b on the primary element a as shown in Figure 3. Two of the parts (w', x' and $w^2$, $x^2$) which together embrace about half the circle of the rotary member, are designed to be rigidly secured as by riveting as at z to the free ends of the primary member a; the third part w, x which embraces substantially the remaining half circle is left with two free ends and is not secured to the primary member a but is adapted to have a sliding movement relatively thereto. For this purpose the third member w, x, is fitted at about the middle with a lug or shoulder piece 10 that is allowed to radially extend outward through a slot in the primary element a where it is pivoted at 11 to one end of a pair of links 12 and the other ends of which links are anchored by pins 13 to a bolt 14 which is rigidly secured to any suitable fixture such as a gear box or other fixed frame indicated at 15 and locked by nuts 16, Figure 1. This attachment to the links 12 is substantially diametrically opposite to the free ends of the primary element a.

It is to be noted that the line of anchorage on one side of the axis of rotation, indicated at 17, should be substantially parallel to that on the other side of that axis and the two lines will be situated at the same distance on each side from such rotational axis. The lines of anchorage may also extend in the same direction or in opposite directions. The slot 11 in the primary element a should be sufficient to allow the lug 10 of the secondary element passing through it a certain amount of freedom and when a braking action is applied, it will be effective no matter whether the rotation of the drum to be braked is clockwise or anti-clockwise.

As this class of brake necessitates comparatively fine clearances when out of action, it is desirable to provide means whereby when the brake is not in operation the clearance is constant around the drum. For this purpose, the half portion w, x of the secondary element has its point of attachment to the anchorage links 12 under the control of a spring 18 which according to the example shown is of bow form and designed to keep the secondary element in close contact with the primary member. The bow spring 18 is held at one end on a pin 19 secured to the anchorage links 12, the spring being bent with a wide loop 20 over a second pin on the link, and the other end 21 of the spring freely presses upon the primary element. A force is thereby set up which tends to press the link outward and thereby draw the secondary element against the inner surface of the primary element.

It is to be noted that when the brake action is applied by raising the lever l, the side hooks n will be forced into contact with the primary band a at k', owing to the obliquity of the compression struts r and the pull rod h.

When the brake is released owing to the lever l being lowered, the free end of the band a will move upwards along the edges of the side hooks n and as the secondary band x, w is frictionally held to the primary band a at 21, the upward movement of the end k will give the necessary clearance at the top of the drum, while the downward movement of the other end g will afford the clearance necessary at the bottom of the drum. The contact between the band a and the hooks n at k' will control the clearance on the central horizontal plane.

By the brake mechanism described in the foregoing, an approximately equi-acting brake is obtained which will function whether the rotary drum is turning in a clockwise or anti-clockwise direction. Moreover the described construction of parts, when used as a reaction for a number of epicyclic gear groups, facilitates the repair or inspection of the brake members, since the brake parts may be removed or taken adrift from the top of the box, and if necessary the whole of the gear groups may be lifted out en bloc. This is due to the use of the anchorage p'' and the strut p' since there is in this way no fixed attachment to the box, as the only restraint is the slot o' at the bottom.

I claim:

1. An equi-acting flexible band brake comprising the combination with a drum the speed of which is to be controlled, of a free ended secondary band brake element embracing about one half of the circumference of the drum, a primary brake band element with two free ends arranged diametrically opposite the secondary brake element and fitting upon the exterior of the secondary element for about one half of the circumference of the drum, and directly fitting upon the drum for its remainder, a lug about midway on the secondary element, a slot in the primary element through which the lug passes to the exterior, means for anchoring the lug to an external fixed point, and means for acting upon the free ends of the primary element whereby it is tightened upon the back of the secondary element for one half of the circumference and directly upon the drum for its remaining half, and allow for a slight amount of circumferential play between the primary element and the ends of the secondary element so that a braking action is effected on the drum whether it is rotating in a clockwise or counterclockwise direction.

2. In a flexible band brake as claimed in claim 1 characterized in that said primary element comprises a main segmental portion riding upon the back of the secondary element, and two auxiliary segmental parts each embracing a part of the drum and forming part of the primary element.

3. An equi-acting flexible band brake comprising the combination with a drum the speed of which is to be controlled, of anchoring means, a secondary brake band element embracing about one half of the circumference of the drum, engaged medially with said anchoring means and having two free ends, a primary brake element with two free ends fitting upon the back of the secondary element and pressing directly upon the drum for the other half of the circumference, and means for tightening the primary element upon the back of the secondary element and the remainder of the drum, whereby a braking action is exerted upon the drum whether it is rotating in a clockwise or counterclockwise direction, the secondary element being grooved externally and engaging similar grooving on the internal surface of the primary element.

4. An equi-acting flexible brake band comprising the combination with a brake drum, a secondary brake band element embracing approximately one half of the circumference of the drum, a primary brake element with two free ends fitting upon the back of the secondary element and pressing directly upon the drum for the other half of the circumference, said primary brake element having a slot therein, a lug arranged medially of the secondary brake element passing through said slot, a fixed anchoring member, a link connecting the anchoring member to said lug, a bow spring mounted at one end on the link and being free at its other end to press upon the exterior of the primary brake element so as to press the secondary brake element against the inside surface of the primary element clear of the drum, when the brake is out of action, and means for tightening the primary element upon the back of the secondary element and the remainder of the drum whereby a braking action is exerted upon the drum whether it is rotating in a clockwise or counterclockwise direction.

5. In a flexible band brake as claimed in claim 1 characterized in that said means includes a pull rod attached to one free end of the primary brake band, a toggle lever with fulcrum and means whereby the lever when actuated may act simultaneously upon the pull rod attached to one end of the primary band, and also act upon the other end of the primary band to draw the ends together and apply the brake.

6. In a flexible band brake as claimed in claim 1 characterized in that said means includes a pull rod attached to one free end of the primary brake band, a shoulder formed on the other free end of the primary brake band, a toggle lever with fulcrum, means whereby the lever when actuated may act simultaneously upon the pull rod of the primary band and also act upon the shoulder of the other end of the primary band to draw the ends together and apply the brake, and means whereby the shouldered end of the primary band receives a radial thrust against the drum to assist the braking action.

7. An equi-acting flexible band brake comprising the combination with a drum the speed of which is to be controlled, of a free ended secondary band brake element embracing about one half of the circumference of the drum, a primary brake band element with two free ends arranged diametrically opposite the secondary brake element and fitting upon the exterior of the secondary element for about one half of the circumference of the drum, and directly fitting upon the drum for its remainder, a lug about midway on the secondary element, a slot in the primary element through which the lug passes to the exterior, means for anchoring the lug to an external fixed point, an eye at one end and a projecting shoulder on the other end of the primary band, of a segmental piece attached to the inside of the shouldered end of the primary band, an abutment surface on the exterior surface of the shouldered end, a pair of parallel side hooks, a fixed fulcrum for one end of such hooks, a toggle lever with fulcrum arranged between the side hooks, compression struts between one end of the toggle lever and the shouldered end of the primary band, and also arranged between the side hooks, and means whereby the lever when actuaated will act simultaneously upon the pull rod attached to one end of the primary band, and also act upon the other end of the primary band to draw the ends together and due to the obliquity of the side hooks and compression struts will produce an additional radial pressure upon the abutting surface of the shouldered end of the primary band.

8. In a flexible band brake as claimed in claim 7 the combination with the pivoted side hooks, of a fixed strut pivoted on the same axis as that of the side hooks, and a spring frictional gripping device between the hooks and the strut to position the former when the brake is out of action.

9. In a flexible band brake as claimed in claim 7 the combination of a strut, with side hooks pivoted on a common pivot pin, an open ended slot in the fixed frame of the device to house the pivot pin, and securing means for normally fixing the upper end of the strut to a fixed frame, the arrangement being such that when the said securing means are unfastened, the whole of the assembly with the drum may be removed en bloc.

WALTER GORDON WILSON.